US008925963B2

(12) United States Patent
Inuzuka et al.

(10) Patent No.: US 8,925,963 B2
(45) Date of Patent: Jan. 6, 2015

(54) AIRBAG COOLANT RELEASING DEVICE AND AIRBAG DEVICE (75) Inventors: Koji Inuzuka, Tokyo (JP); Atsushi Noguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/346,267

(22) PCT Filed: Aug. 6, 2012

(86) PCT No.: PCT/JP2012/069985
§ 371 (c)(1),
(2), (4) Date: Mar. 20, 2014

(87) PCT Pub. No.: WO2013/042469
PCT Pub. Date: Mar. 28, 2013

(65) Prior Publication Data
US 2014/0225353 A1    Aug. 14, 2014

(30) Foreign Application Priority Data

Sep. 21, 2011   (JP) .................................. 2011-205560

(51) Int. Cl.
*B60R 21/26*   (2011.01)
*B60R 21/2334*   (2011.01)

(52) U.S. Cl.
CPC ............. *B60R 21/2334* (2013.01); *B60R 21/26* (2013.01); *B60R 2021/26017* (2013.01)
USPC ............................ 280/741; 280/735; 280/736

(58) Field of Classification Search
CPC ................. B60R 21/2644; B60R 2021/26017; B60R 21/217

USPC .......................................... 280/735, 736, 741
See application file for complete search history.

(56) References Cited

U.S. PATENT DOCUMENTS

| 7,690,680 | B2 * | 4/2010 | Meissner et al. ............... 280/736 |
| 8,025,310 | B2 | 9/2011 | Meissner et al. |
| 8,029,018 | B2 | 10/2011 | Meissner et al. |

(Continued)

FOREIGN PATENT DOCUMENTS

| DE | 19602695 A1 * | 7/1997 |
| JP | 2009-528211 | 8/2009 |

(Continued)

OTHER PUBLICATIONS

International Search report mailed Oct. 30, 2012 issued in connection with PCT/JP2012/069985, with English translation.

*Primary Examiner* — Ruth Ilan
*Assistant Examiner* — Darlene P Condra
(74) *Attorney, Agent, or Firm* — Foley & Lardner LLP (57) ABSTRACT There is provided an airbag coolant releasing device for releasing a coolant into an airbag. The device includes: a cylinder which is formed into a cylindrical shape; a coolant pack which is formed of a flexible film, wherein a coolant is sealed in the coolant pack and the coolant pack is received in the cylinder; a piston which is inserted into the cylinder; a drive unit which drives the piston with respect to the cylinder such that the piston presses the coolant pack; and a nozzle which is provided in an end portion of the cylinder which is located opposite to a side of the drive unit and which releases the coolant ejected from the coolant pack into the airbag.

7 Claims, 8 Drawing Sheets (56) References Cited

U.S. PATENT DOCUMENTS

| | | |
|---|---|---|
| 8,047,568 B2 | 11/2011 | Meissner et al. |
| 2009/0066067 A1 | 3/2009 | Meissner et al. |
| 2010/0201109 A1 | 8/2010 | Meissner et al. |
| 2010/0201110 A1 | 8/2010 | Meissner et al. |
| 2011/0079993 A1* | 4/2011 | Schreiber et al. ............ 280/741 |

FOREIGN PATENT DOCUMENTS

| | | |
|---|---|---|
| JP | 2011-098674 | 5/2011 |
| JP | 2011-116229 | 6/2011 |
| JP | 2011-116230 | 6/2011 |
| WO | WO 2004/069586 | 8/2004 |

* cited by examiner

AIRBAG COOLANT RELEASING DEVICE AND AIRBAG DEVICE

CROSS REFERENCE TO RELATED APPLICATIONS

The present application is a U.S. National Stage of International Application No. PCT/JP2012/069985 filed on Aug. 6, 2012, which claims the benefit of Japanese Patent Application No. 2011-205560 filed on Sep. 21, 2011. The entire disclosures of which are incorporated herein by reference.

TECHNICAL FIELD

The present invention relates to a coolant releasing device which releases a coolant into an airbag of a vehicle such as a car so as to adjust the internal pressure of the airbag, and an airbag device having such a coolant releasing device.

BACKGROUND ART

An airbag device is provided in a vehicle such as a car. The airbag device has an airbag which is made of a cloth panel and formed into a bag-like shape so that the airbag can be unfolded and inflated to restrain a passenger when unfolding gas is blown into the airbag at the time of collision. In such an airbag device, proper control of the internal pressure of the airbag is required in order to reduce an acceleration peak received by the passenger while inflating the airbag early. To this end, for example, a proposal has been made that the internal pressure is set at relatively high pressure in order to unfold the airbag early immediately after collision, and the pressure is then reduced to reduce the acceleration received by the passenger who has been restrained.

In the background art, it has been general that exhaust units such as vent holes are provided in the airbag and characteristics of the airbag are tuned by the number of the exhaust units, the layout thereof, etc. so that the internal pressure of the airbag can be reduced to proper pressure after the airbag is unfolded and inflated.

In addition, in the background art, a proposal has been made that gas used for unfolding the airbag is cooled to reduce the internal pressure of the airbag to proper pressure.

When a liquid coolant is released at a predetermined timing while or after the airbag is unfolded and inflated, the unfolding gas can be cooled by the heat of evaporation of the coolant to reduce the internal pressure of the airbag. Thus, it is possible to obtain good passenger restraining performance.

As such a coolant releasing device, a device in which a coolant such as an antifreeze solution is sealed in the interior of a cylinder by a piston of silicon rubber etc. and the piston is pressed by use of gas generated by a micro gas generator (MGG) to thereby release the coolant has been proposed, for example, in Patent Literature 1.

In addition, another coolant releasing device in which a coolant is reserved in a tube-like container having a below-like fragile portion formed therein and the container is received in a cylinder so that the container can be compressed axially by a piston to release the coolant has been described in Patent Literature 2.

CITATION LIST

Patent Literature

Patent Literature 1: JP-A-2011-116230
Patent Literature 2: JP-A-2011-116229

SUMMARY OF THE INVENTION

Technical Problem

It is necessary to maintain the coolant releasing device not to leak the coolant, for example, over the lifetime of the vehicle (for at least 10 years by way of example).

In the case where the coolant is sealed in a gap between an inner circumferential surface of the cylinder and an outer surface of the piston made of rubber as disclosed in Patent Literature 1, the coolant is sealed between the rubber piston and the inner circumferential surface of the cylinder. Therefore, when foreign matter or the like enter the gap, there is a concern that the coolant may leak.

In addition, it is necessary to perform strict dimensional management on the piston having such a high sealing property and it is also necessary to perform accurate management as to the working for assembling the piston into the cylinder. Accordingly, there is a concern that the number of production steps may be increased and the cost caused thereby may be increased accordingly.

In addition, when the coolant is received in the tube-like container as disclosed in Patent Literature 2, it is necessary to pay additional cost for a mold etc. for forming the coolant container. In addition, such a container needs to be designed specially in accordance with the shape and size of the coolant releasing device. Therefore, there is a concern that the number of man-hours and cost required for the design, production of the mold, etc. may be further increased.

In consideration of the aforementioned problems, an object of the invention is to provide an airbag coolant releasing device in which leak of a coolant can be prevented by a simple configuration, and an airbag device provided with such an airbag coolant releasing device.

Solution to Problem

In order to solve the aforementioned problems, in an airbag coolant releasing device for releasing a coolant into an airbag, the device comprises: a cylinder which is formed into a cylindrical shape; a coolant pack which is formed of a flexible film, wherein a coolant is sealed in the coolant pack and the coolant pack is received in the cylinder; a piston which is inserted into the cylinder; a drive unit which drives the piston with respect to the cylinder such that the piston presses the coolant pack; and a nozzle which is provided in an end portion of the cylinder which is located opposite to a side of the drive unit and which releases the coolant ejected from the coolant pack into the airbag.

According to the airbag coolant releasing device, the coolant is sealed in the coolant pack made of the film so that leak resistance of the coolant can be improved without the necessity of sealing the coolant by the piston etc. in a normal situation (prior to collision).

In addition, such a coolant pack can be manufactured without use of a mold etc., inexpensively, and with a smaller number of man-hours.

Further, since it is not necessary to seal the coolant by the piston in a normal situation, the diameter of the piston and the diameter of the cylinder can be increased easily and the length of the cylinder in the direction of a central axis thereof can be shortened in comparison with that in an existing device which seals a coolant by a piston and whose capacity is equivalent.

In this manner, the whole length of the coolant releasing device can be made close to that of a disc-type inflator generating unfolding gas, and the coolant releasing device can be easily externally attached to a wall surface of the retainer in which the airbag is received, so that the coolant releasing device can be arranged side by side with the inflator. Thus, the coolant releasing device can be applied to an existing airbag device by minor design change.

In the invention, the coolant may be sealed in the coolant pack in a liquid state.

In the airbag coolant releasing device according to the present invention, the cylinder may comprise a first member that is provided with the nozzle and a second member that is removably attached to the first member, and the cylinder may comprise a temporary lock mechanism including a locking portion which is provided in one of the first member and the second member and a locked portion which is provided in the other of the first member and the second member so as to be engaged with the locking portion.

According to this configuration, the first member and the second member can be temporarily locked easily before the first member and the second member are finally fastened to each other. Thus, the working performance of the assembling step can be improved.

The nozzle may be provided with a conical body, and the conical body may be disposed in a center portion of an opening formed in an end face of the cylinder, and the conical body has a tip portion which is disposed on a side of the coolant pack.

According to this configuration, the coolant ejected from the cylinder collides with the conical body so that the coolant can form an excellent spray.

In addition, the coolant pack is pierced by the tip portion of the conical body so that the coolant pack can be ruptured surely to thereby release the coolant.

In addition, an airbag device comprises: an airbag which is formed into a bag-like shape and which is unfolded and inflated when unfolding gas is supplied into the airbag; a retainer, wherein, in a normal state, the airbag is folded and received in the retainer; an inflator which supplies the unfolding gas into the airbag; and an airbag coolant releasing device according to any one of claims 1 through 3 which releases a coolant into the airbag while or after the airbag is unfolded and inflated.

According to this configuration, it is possible to provide an airbag device having effects of the aforementioned airbag coolant releasing device.

In addition, in the airbag device according to the present invention, the inflator and the airbag coolant releasing device may be disposed adjacent to each other on the same wall surface portion of the retainer.

According to this configuration, the airbag coolant releasing device may be also applied to an existing airbag device by minor design change.

In addition, the airbag device according to the invention may have a configuration in which the nozzle of the airbag coolant releasing device is disposed to protrude toward an inner side of the retainer.

According to this configuration, the coolant can form a spray surely inside the airbag while or after the airbag is unfolded and inflated.

Advantageous Effects of Invention

As described above, according to the invention, it is possible to provide an airbag coolant releasing device which can prevent leak of a coolant by a simple configuration, and an airbag device provided with such a coolant releasing device.

BRIEF DESCRIPTION OF THE DRAWINGS

FIGS. 4A and 4B are perspective views of the outline of a coolant pack in the coolant releasing device in FIG. 1, wherein FIG. 4A shows a state before molding and FIG. 4B shows a state after molding;

DETAILED DESCRIPTION OF THE PREFERRED EMBODIMENTS

An embodiment of a coolant releasing device and an airbag device according to the invention will be described below.

The airbag device according to the embodiment is provided in a car such as a passenger car. For example, the airbag device is applied to a passenger seat airbag for front collision. The passenger seat airbag is provided in an installment panel in front of an passenger seat. Also, for example, the invention may be applied to a driver's seat airbag which is provided in a boss portion of a steering wheel, a knee bag which is provided in a lower portion of the installment panel to restrain a knee portion of a passenger, a side airbag which is provided in a side portion of a seat, a curtain airbag which is unfolded into a curtain-like shape along a side window, etc. Incidentally, the shapes, layout, etc. of respective constituent members may be changed suitably in accordance with the place where the airbag device is applied.

Figure 1:
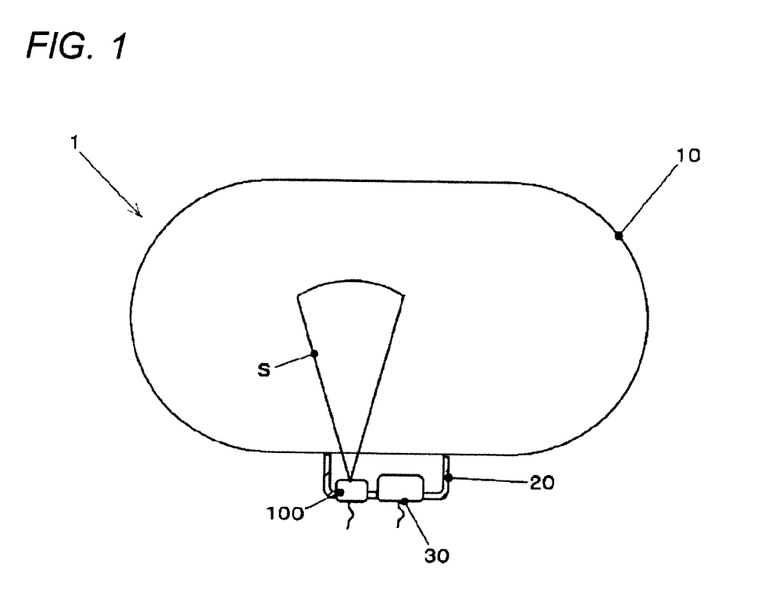
FIG. 1 is a schematic view showing the configuration of an airbag device having an embodiment of a coolant releasing device according to the present invention.

As shown in FIG. 1, an airbag device 1 is configured to have an airbag 10, a retainer 20, an inflator 30, a coolant releasing device 100 etc.

For example, the airbag 10 is formed into a bag-like shape out of a plurality of panels which have been cut out from nylon-based or polyester-based cloth and sewed up together. In a normal situation, the airbag 10 is received in a folded state inside the retainer 20.

On collision, unfolding gas generated by the inflator 30 is introduced into the airbag 10 so that the airbag 10 is unfolded and inflated inside the cabin of a vehicle to thereby restrain a not-shown passenger.

Figure 2:
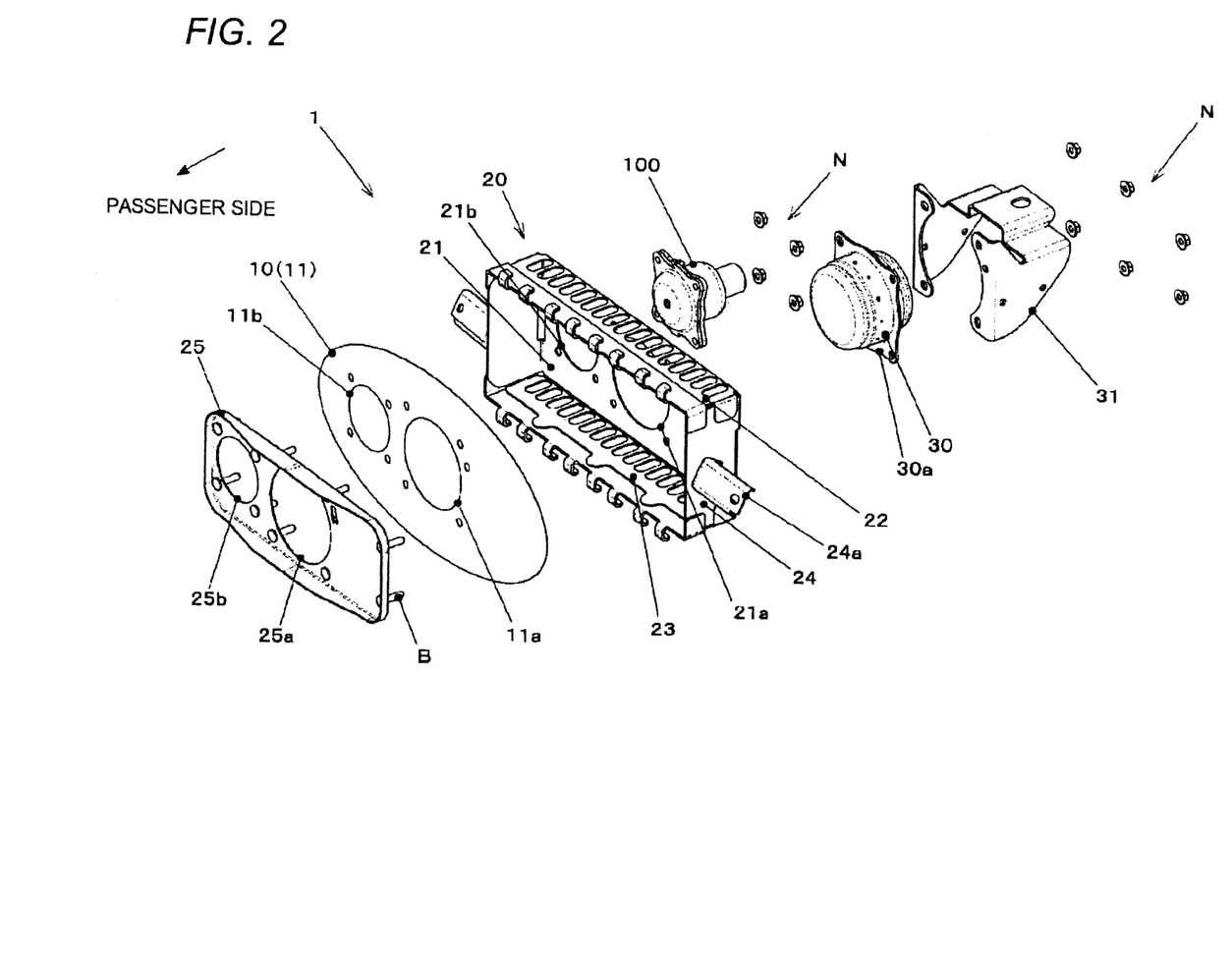
FIG. 2 is an exploded perspective view of a retainer peripheral portion in the airbag device in FIG. 1.

In FIG. 2, of the cloth panels constituting the airbag 10, only a part in the periphery of the retainer 20 is cut out and illustrated.

As shown in FIG. 2, an inflator opening 11a and a coolant releasing device opening 11b are formed in a cloth panel 11 in the periphery of the retainer 20 of the airbag 10.

The inflator opening 11a is a circular opening as a portion into which an end portion of the inflator 30 is inserted.

The coolant releasing device opening 11b is a circular opening as a portion into which an end portion of the coolant releasing device 100 is inserted.

The coolant releasing device opening 11b is disposed adjacently to the inflator opening 11a.

In addition, openings are formed in the periphery of the inflator opening 11a and the coolant releasing device opening 11b so that bolts B for fixing a bag ring which will be described later can be inserted into the openings.

The retainer 20 is a container-like member in which the airbag 10 which has not been unfolded and inflated yet is folded and received.

In addition, the inflator 30 and the coolant releasing device 100 are provided in the retainer 20.

The retainer 20 has a bottom face portion 21, an upper face portion 22, a lower face portion 23, side face portions 24, etc. The retainer 20 is formed into a box-like shape opened on the passenger side.

The bottom face portion 21 is disposed substantially oppositely to the passenger. The bottom face portion 21 is a flat platelike portion as a base portion to which the inflator 30 and the coolant releasing device 100 are attached.

An inflator opening 21a and a coolant releasing device opening 21b are formed in the bottom face portion 21.

The inflator opening 21a is a circular opening as a portion into which the end portion of the inflator 30 is inserted.

The coolant releasing device opening 21b is a circular opening as a portion into which the end portion of the coolant releasing device 100 is inserted.

The coolant releasing device opening 21b is disposed adjacently to the inflator opening 21a.

In addition, openings are formed in the periphery of the inflator opening 21a and the coolant releasing device opening 21b so that the bolts for fixing the bag ring which will be described later can be inserted into the openings.

The inflator opening 21a and the coolant releasing device opening 21b of the retainer 20 are disposed on top of the inflator opening 11a and the coolant releasing device opening 11b of the airbag 10.

The upper face portion 22, the lower face portion 23, and the side face portions 24 are substantially flat plate-like portions disposed to protrude outward toward the passenger side from an upper end portion, a lower end portion and side surface portions of the bottom face portion 21, respectively.

In addition, brackets 24a for attaching the retainer 20 to the vehicle body side are provided to outer surface portions of the side face portions 24.

In addition, the retainer 20 is provided with the bag ring 25. The bag ring 25 is a metal fitting disposed inside the airbag 10. The bag ring 25 cooperates with the bottom face portion 21 to hold the cloth panel 11 to thereby fix the airbag 10 to the retainer 20.

The bag ring 25 is formed into a rectangular plate-like shape. An outer circumferential edge portion of the bag ring 25 is folded back on the passenger side (on the opposite side to the bottom face portion 21).

An inflator opening 25a and a coolant releasing device opening 25b are formed in the bag ring 25.

The inflator opening 25a is a circular opening serving as a portion into which the end portion of the inflator 30 is inserted.

The coolant releasing device opening 25b is a circular opening as a portion in which the end portion of the coolant releasing device 100 is inserted.

The coolant releasing device opening 25b is disposed adjacently to the inflator opening 25a.

The plurality of bolts B protruding toward the bottom face portion 21 are provided in the bag ring 25.

The bolts B are inserted into the openings formed in the cloth panel 11 of the airbag 10 and the bottom face portion 21 of the retainer 20.

Nuts N are fastened to the bolts B so that the bag ring 25 is fixed to the retainer 20 to thereby fix the airbag 10.

In addition, a part of the bolts B are fastened to both a flange of the inflator 30 and a flange of the coolant releasing device 100 so as to serve for fixing the inflator 30 and the coolant releasing device 100.

The inflator 30 is an unfolding gas supply device which generates high-temperature unfolding gas for unfolding and inflating the airbag 10 based on a signal issued from a not-shown airbag controller. The inflator 30 is provided with a gas generating agent for generating nitrogen gas etc. during combustion and an ignitor which ignites the gas generating agent through a firelighter.

The inflator 30 is of a so-called disc-type inflator in which a fixation flange 30a is provided in the periphery of a body portion formed into a disc-like shape (a columnar shape having an axial length short with respect to its outer diameter).

The inflator 30 has a plurality of gas ejection holes formed in an outer circumferential surface portion located closer to the passenger side than the flange 30a.

The flange 30a in which the gas ejection holes protrude inside the airbag 10 is fastened by the bolts B and the nuts N so that the inflator 30 is fixed to the bottom face portion of the retainer 20.

In addition, a bracket 31 for fixing the airbag device 1 to the vehicle body is provided in an end portion of the inflator 30 opposite to the passenger side.

The coolant releasing device 100 is provided for releasing a coolant such as an antifreeze solution into the airbag 10 in accordance with a signal issued from the airbag controller during or after unfolding and inflation of the airbag 10 in order to reduce the internal pressure of the airbag 10.

Figure 3:
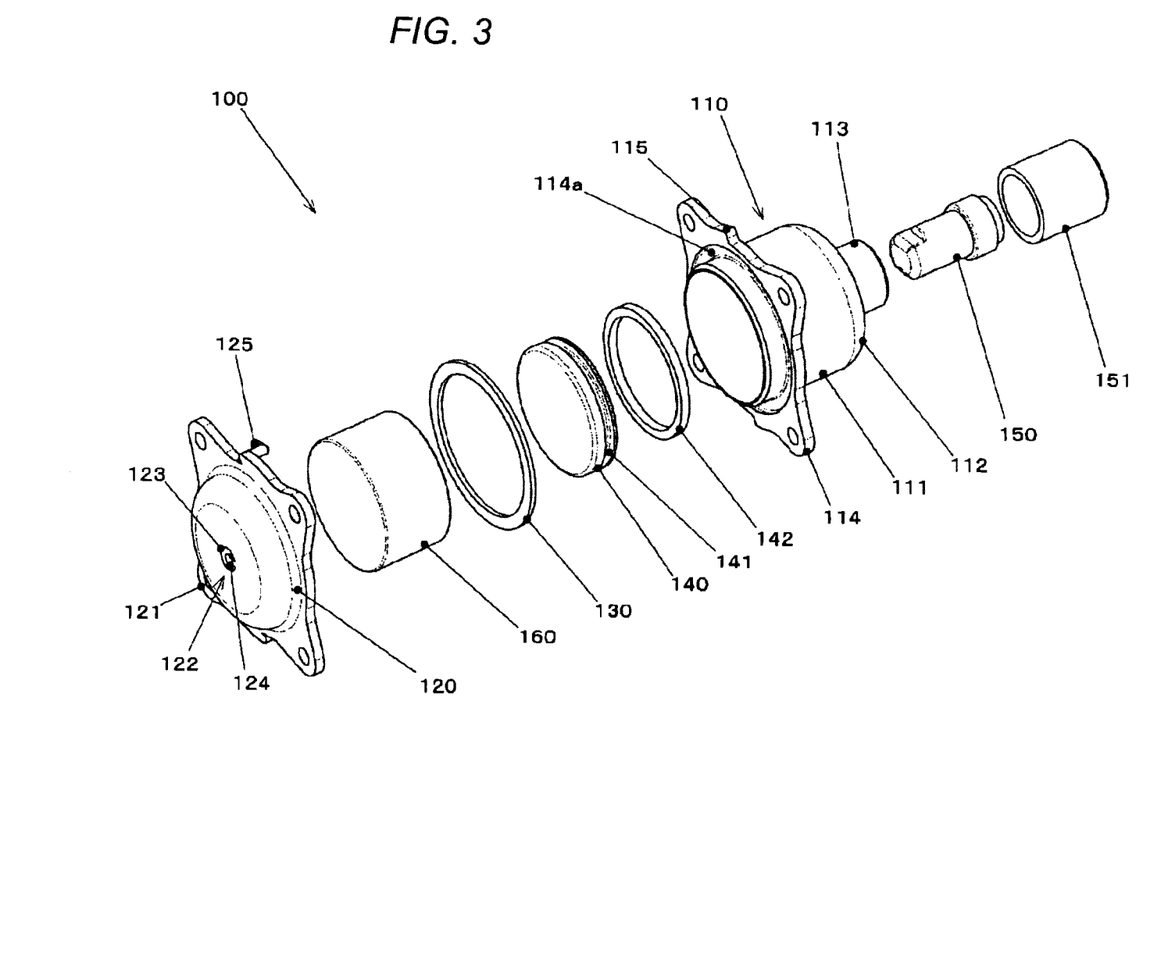
FIG. 3 is an exploded perspective view of the coolant releasing device in FIG. 1.

As shown in FIG. 3 etc., the coolant releasing device 100 is configured to include a bottle lower part 110, a bottle upper part 120, a gasket 130, a piston 140, a micro gas generator (MGG) 150, a coolant pack 160 etc.

The bottle lower part 110 and the bottle upper part 120 cooperate with each other to form a cylinder portion which receives the coolant pack 160 and the piston 140 for pressing the coolant pack 160.

The bottle lower part 110 is configured so that one end portion (an opposite end portion to the airbag 10 side) of a body portion 111 formed into a cylindrical shape is substantially closed by an end face 112.

A cylindrical mount portion 113 to which the MGG 150 is attached is formed in a center portion of the end face 112 so as to be substantially concentric to the body portion 111. The mount portion 113 is formed to protrude from the end face 112 toward the opposite side to the body portion 111.

A screw portion to which a cap 151 of the MGG 150 is fastened as will be described later is formed in an outer circumference surface of the mount portion 113.

A flange 114 overhanging like a collar toward the outer diameter side from the outer circumferential surface is formed in an opposite end portion of the body portion 111 to the end face 112.

A hooking portion 115 on which a stop portion 125 of the bottle upper part 120 is hooked is formed in a portion in an outer circumferential edge portion of the flange 114.

The bottle upper part 120 is a member which is substantially shaped like a disc to close an open end portion of the body portion 111 of the bottle lower part 110.

A flange 121 connected to the flange 114 of the bottle lower part 110 is formed in an outer circumferential edge portion of the bottle upper part 120.

In addition, a nozzle 122 for ejecting a coolant from the interior of the cylinder into the airbag 10 is formed in a center portion of the bottle upper part 120.

The nozzle 122 is configured such that a conical portion 124 having a sharp tip portion disposed to protrude toward the bottle lower part 110 is provided in a center portion of a circular opening 123.

The conical portion 124 is supported by a coupling portion disposed between the conical portion 124 and an inner circumferential edge portion of the opening 123.

The bottle upper part 120 is disposed so that the nozzle 122 protrudes outward from the bottom face 21 of the retainer 20 so as to be positioned inside the airbag 10 and the retainer 20.

The stop portion 125 engaged with the hooking portion 115 of the bottle lower part 110 is formed in an outer circumferential edge portion of the flange 121.

The stop portion 125 is shaped like a hook out of a protrusion which has a tip portion protruding toward the bottle lower part 110 from the outer circumferential edge portion of the flange 121 and which further protrudes on one circumferential side of the cylinder.

The stop portion 125 is locked on the hooking portion 115 of the bottle lower part 110 when the bottle upper part 120 is turned around the central axis of the cylinder with respect to the bottle lower part 110 in the state in which the flanges 114 and 121 of the bottle lower part 110 and the bottle upper part 120 are butted against each other.

The stop portion 125 and the hooking portion 115 are used for temporarily locking the bottle lower part 110 and the bottle upper part 120 on each other when they are assembled at the bag apparatus 1.

The bottle lower part 110 and the bottle upper part 120 which are temporarily locked on each other are attached to the retainer 20, and the bolts B protruding from the bag ring 25 are inserted into the openings of the flanges 114 and 121 and fastened with the nuts N. Thus, the bottle lower part 110 and the bottle upper part 120 are fixed to each other.

The gasket 130 is held between the flange 114 of the bottle lower part 110 and the flange 121 of the bolt upper part 120 so as to seal a gap between the flanges 114 and 121.

For example, the gasket 130 is formed annularly out of a silicon-based rubber material. For example, the sectional shape of the gasket 130 taken along the diameter direction is formed into a rectangular shape.

The gasket 130 is fitted into a groove portion 114a formed in a face portion of the flange 114 of the bottle lower part 110 which faces a bottle upper part 120.

The piston 140 is inserted into an inner diameter side of the body portion 111 of the bolt lower part 110. The piston 140 is a substantially disc-like member which can move axially relatively to the bottle lower part 110.

Upon reception of the pressure of gas generated by the MGG 150, the piston 140 is driven to move toward the bottle upper part 120 to press and rupture the coolant pack 160 so as to release the coolant into the airbag 10.

Piston ring grooves 141 which are, for example, circumferential grooves each having a rectangular section are formed in an outer circumferential surface of the piston 140.

A piston ring 142 formed annularly, for example, out of silicon-based rubber etc. is assembled on the piston ring grooves 141. The piston ring 142 seals a gap between the outer circumferential surface of the piston 140 and the inner circumferential surface of the body portion 111 of the bottle lower part 110 so as to prevent the coolant from flowing backward and the coolant releasing gas from leaking out during the operation of the unit. In addition, the piston ring 142 slides against the inner circumferential surface of the body portion 111 while the piston 140 is driven.

The MGG 150 is a drive unit which generates the coolant releasing gas, for example, by use of gunpowder so as to drive the piston 140.

The MGG 150 is substantially formed into a columnar shape. The MGG 150 is inserted into the mount portion 113 of the bottle lower part 110 so as to be retained therein.

In addition, the cap 151 substantially formed into a cylindrical shape is provided in a rear end portion (an opposite end portion to the piston 140 side) of the MGG 150.

A threaded portion formed in the inner circumferential surface of the cap 151 is fastened to the screw portion formed in the mount portion 113 so that the cap 151 is fixed to the bottle lower part 110 and hence the MGG 150 is fixed.

The coolant pack 160 is formed such that, for example, a pack made of a flexible film is formed into a bag-like shape to enclose the coolant such as an antifreeze solution therein.

The film constituting the coolant pack is formed such that, for example, a resin layer of polyethylene etc. is laminated, for example, on opposite surfaces of a base material made of an aluminum alloy.

Figure 4A:
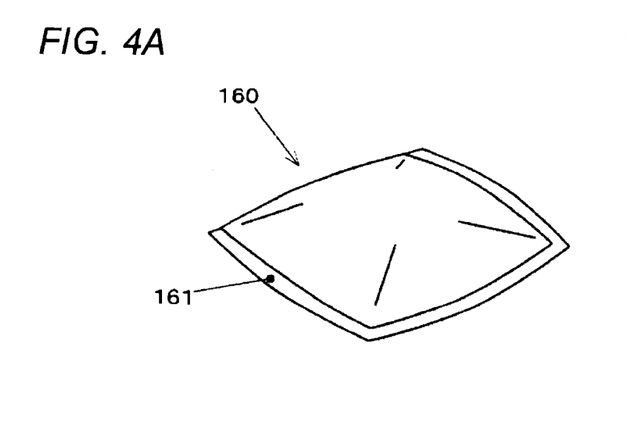

As shown in FIG. 4A, the coolant pack 160 is formed such that a rectangular film is folded back in the center portion and an outer circumferential edge portion 161 is welded in a state in which a coolant is enclosed between the folded portions of the rectangular film.

Figure 4B:
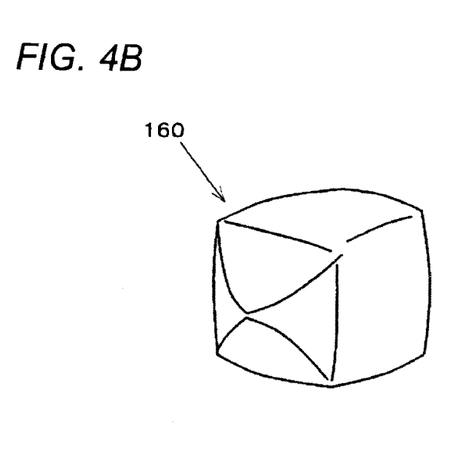

Then, the coolant pack 160 is inflated at its center portion and folded at its end portion, for example, by a worker so that the coolant pack 160 can be inserted into the inner diameter side of the bottle lower part 110. Thus, the coolant pack 160 is molded to have such a shape that the coolant pack 160 can be inserted into a cylinder having a disc-like shape, a cubic shape or the like, as shown in FIG. 4B. Due to the strength of the aluminum layer of the film, the coolant pack 160 can keep the shape molded thus.

The coolant pack 160 which has been molded is received in a region closer to the nozzle 122 than the piston 140 in the cylinder.

On this occasion, the coolant pack 160 is disposed to prevent its outer circumferential edge portion (welded portion) from facing the nozzle 122.

Next, operation of the aforementioned airbag device 1 will be described.

When the not-shown airbag controller determines that it is necessary to unfold and inflate the airbag 10 based on an output of a collision detector such as an acceleration sensor or an output of a pre-crash detector for detecting a sign of collision, the ignitor of the inflator 30 is ignited to thereby start generation of high-temperature unfolding gas.

Unfolding gas ejected from the inflator 30 is blown into the airbag 10 folded inside the retainer 20 to thereby unfold and inflate the airbag 10.

In addition, with a delay of a predetermined time from the start of generation of the unfolding gas from the inflator 30, the airbag controller ignites the MGG 150 of the coolant releasing device 100 so as to start generation of coolant releasing gas from the MGG 150.

Figure 5:
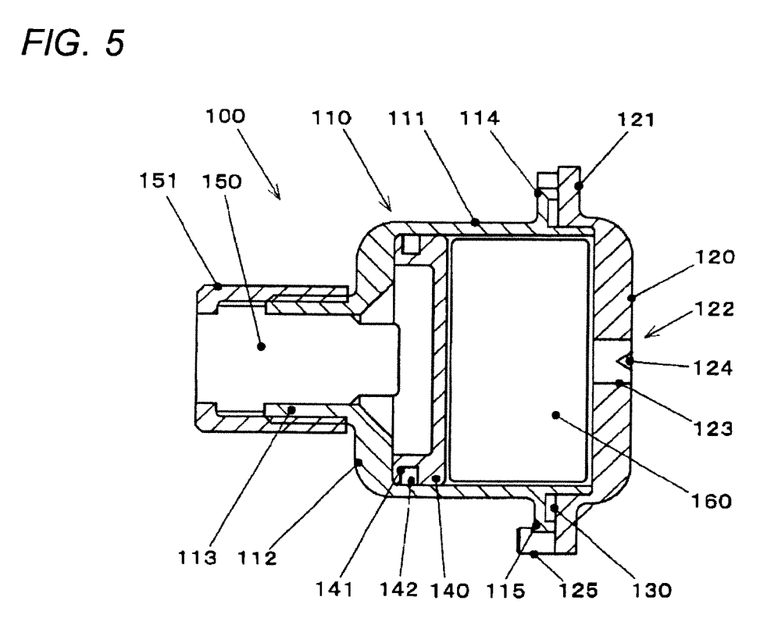
FIG. 5 is a sectional view of the coolant releasing device in FIG. 1 cut along a plane including a central axis of a cylinder, showing a state of the coolant releasing device before operation.
Figure 6:
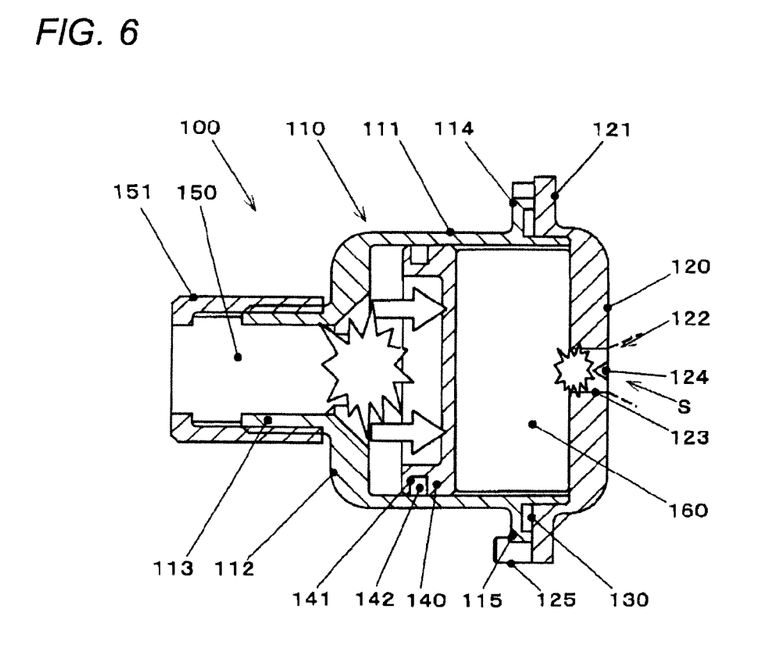
FIG. 6 is a sectional view of the coolant releasing device in FIG. 1 cut along the plane including the central axis of the cylinder, showing a state of the coolant releasing device in operation.

In this manner, the piston 140 in the state shown in FIG. 5 starts to move toward the nozzle 122 due to the pressure of the coolant releasing gas so that the piston 140 starts to press the coolant pack 160 as shown in the state shown in FIG. 6.

The coolant pack 160 pressed by the piston 140 is pressed against the bottle upper part 120 so that the internal pressure of the coolant pack 160 increases. Further, since the coolant pack 160 is pressed by the piston 140, the coolant pack 160 partially entering the opening 123 of the nozzle 122 is pierced by the tip portion of the conical portion 124 so as to be ruptured.

Since the coolant released due to the rupture of the coolant pack 160 collides with the conical portion 124 of the nozzle 122 in a high pressure state, the coolant turns into a spray (spray S), which is released into the airbag 10 to cool the high-temperature unfolding gas inside the airbag 10 to thereby reduce the internal pressure rapidly.

Figure 7:
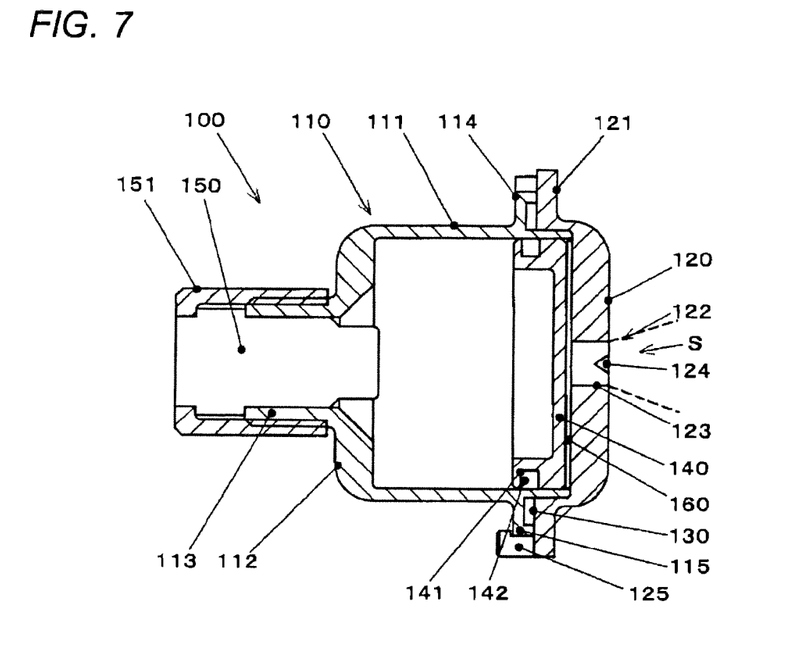
FIG. 7 is a sectional view of the coolant releasing device in FIG. 1 cut along the plane including the central axis of the cylinder, showing a state of the coolant releasing device after completion of operation.

Then, the release of the spray S of the coolant continues until the piston 140 abuts against the bottle upper part 120 as shown in FIG. 7. As soon as the piston 140 is stopped, the release of the spray S of the coolant is terminated.

On this occasion, substantially the whole amount of the coolant received in the coolant pack 160 is released into the airbag 10 so as to cool unfolding gas due to the latent heat of vaporization thereof etc.

Figure 8:
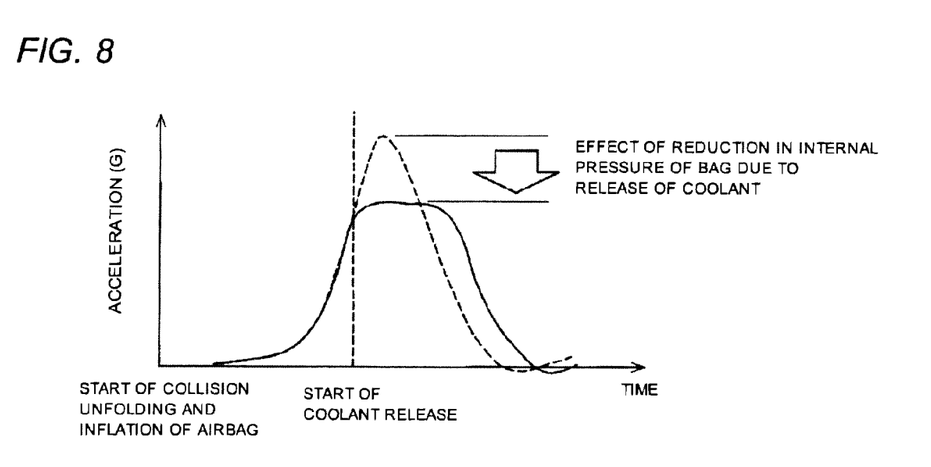
FIG. 8 is a view showing an example of a temporal history of acceleration of a dummy doll head portion in the airbag device in an embodiment and a comparison example of the invention.

FIG. 8 is a graph showing an example of a temporal history of acceleration of a dummy doll head portion during a collision test in the airbag device according to the embodiment.

The abscissa axis indicates a time elapsed after collision and the ordinate axis indicates acceleration (G) in the dump doll head portion.

In addition, data of the embodiment are indicated by the solid line while data of a comparative example of the invention are indicated by the broken line.

In an airbag device according to the comparative example, the coolant releasing device 100 has been removed from the airbag device 1 according to the embodiment.

In the embodiment, the coolant is released into the airbag 10 with a delay of a predetermined time after the airbag 10 is unfolded and inflated. The unfolding gas is cooled by the latent heat of vaporization of the coolant etc. so that the internal pressure of the airbag 10 can be prevented from increasing excessively.

Thus, it is possible to reduce a peak value of acceleration received by the dummy doll head portion, as shown in FIG. 8.

According to the coolant releasing device 100 and the airbag device 1 according to the aforementioned embodiment, it is possible to obtain the following effects.

(1) Since the coolant is enclosed in the coolant pack 160 made of the film, it is not necessary to seal the coolant by the piston 140 in a normal state so that leak resistance of the coolant can be improved.

In addition, such a coolant pack 160 can be manufactured inexpensively by a small number of man-hours without the necessity of any tool such as a mold, for example, by use of a commercially available film for retort pouch food and production facilities thereof.

(2) Since it is not necessary to seal the coolant by the piston 140 in a normal state, the diameter of the piston and the diameter of the cylinder can be increased easily and the length of the cylinder in the direction of the central axis can be shortened in comparison with that in an existing device which seals a coolant by a piston and whose capacity is equivalent.

In this manner, the whole length of the coolant releasing device 100 can be made close to that of the disc-type inflator 30, and the coolant releasing device 100 can be easily externally attached to the bottom face 21 of the retainer 20 so that the coolant releasing device 100 can be arranged side by side with the inflator 30. Thus, the coolant releasing device 100 can be applied to an existing airbag device by minor design change.

(3) Due to the stop portion 125 and the hooking portion 115 provided for temporarily locking the bottle lower part 110 and the bottle upper part 120 constituting the cylinder of the coolant releasing device 100, the bottle lower part 110 and the bottle upper part 120 can be temporarily locked easily before the bottle lower part 110 and the bottle upper part 120 are coupled to each other finally. Thus, the working performance of the assembling step can be improved.

(4) Due to the configuration in which the conical portion 124 having the tip portion disposed on the coolant pack 160 side is disposed in the center portion of the opening 123 of the nozzle 122, the coolant pack 160 is pierced by the sharp tip portion of the conical portion 124 so that the coolant pack 160 can be surely ruptured to thereby release the coolant. In addition, the coolant ejected from the cylinder can collide with the conical portion 124 to thereby form a spray S preferably.

Incidentally, the scope of the present invention is not limited to the aforementioned embodiment. Any suitable change may be added to the configuration of the coolant releasing device and the configuration of the airbag device so that the shapes, structures, layout, etc. of respective members constituting the airbag device can be changed suitably.

For example, although the film constituting the coolant pack is formed such that a polyethylene layer is formed on opposite surfaces of an aluminum-based alloy layer in the embodiment, the present invention is not limited thereto. Alternatively, a film having another configuration may constitute the coolant pack. For example, the metal layer serving as the base material is not limited to an aluminum-based alloy but another material may be used. In addition, the resin layer formed on each of the surfaces of the metal layer may be made of another material such as PET.

In addition, the way of folding the coolant pack is not limited particularly. Any way of folding the coolant pack may be used as long as the coolant pack can be received in the cylinder.

The invention claimed is:

1. An airbag coolant releasing device for releasing a coolant into an airbag, the device comprising:
    a cylinder which is formed into a cylindrical shape;
    a coolant pack which is formed of a flexible film, wherein a coolant is sealed in the coolant pack and the coolant pack is received in the cylinder;
    a piston which is inserted into the cylinder;
    a drive unit which drives the piston with respect to the cylinder such that the piston presses the coolant pack; and
    a nozzle which is provided in an end portion of the cylinder which is located opposite to a side of the drive unit and which releases the coolant ejected from the coolant pack into the airbag.

2. The device according to claim 1, wherein the coolant is sealed in the coolant pack in a liquid state.

3. The device according to claim 1, wherein
    the cylinder comprises a first member that is provided with the nozzle and a second member that is removably attached to the first member, and
    the cylinder comprises a temporary lock mechanism including a locking portion which is provided in one of the first member and the second member and a locked portion which is provided in the other of the first member and the second member so as to be engaged with the locking portion.

4. The device according to claim 1, wherein
    the nozzle is provided with a conical body, and
    the conical body is disposed in a center portion of an opening formed in an end face of the cylinder, and the conical body has a tip portion which is disposed on a side of the coolant pack.

5. An airbag device comprising:
- an airbag which is formed into a bag-like shape and which is unfolded and inflated when unfolding gas is supplied into the airbag;
- a retainer, wherein, in a normal state, the airbag is folded and received in the retainer;
- an inflator which supplies the unfolding gas into the airbag; and
- an airbag coolant releasing device according to claim 1 which releases a coolant into the airbag while or after the airbag is unfolded and inflated.

6. The airbag device according to claim 5, wherein the inflator and the airbag coolant releasing device are disposed adjacent to each other on the same wall surface portion of the retainer.

7. The airbag device according to claim 5, wherein the nozzle of the airbag coolant releasing device is disposed to protrude toward an inner side of the retainer.

* * * * *